(12) United States Patent
Yu et al.

(10) Patent No.: US 9,031,326 B2
(45) Date of Patent: May 12, 2015

(54) SYSTEM AND METHOD FOR EFFECTIVELY PERFORMING AN IMAGE CATEGORIZATION PROCEDURE

(75) Inventors: Liangyin Yu, Fremont, CA (US);
Ming-Chang Liu, San Jose, CA (US);
Kuang-Man Huang, San Jose, CA (US)

(73) Assignee: Sony Corporation, Tokyo (JP)

( * ) Notice: Subject to any disclaimer, the term of this patent is extended or adjusted under 35 U.S.C. 154(b) by 245 days.

(21) Appl. No.: 13/397,909

(22) Filed: Feb. 16, 2012

(65) Prior Publication Data
US 2013/0216138 A1    Aug. 22, 2013

(51) Int. Cl.
*G06K 9/46* (2006.01)
*G06K 9/62* (2006.01)

(52) U.S. Cl.
CPC ............ *G06K 9/6284* (2013.01); *G06K 9/4671* (2013.01)

(58) Field of Classification Search
CPC ...... G06K 9/4671; G06K 9/40; G06K 9/4609
USPC ................. 382/201, 181, 190, 282, 305, 165; 707/102, 104, 6, 748, 780
See application file for complete search history.

(56) References Cited

U.S. PATENT DOCUMENTS

| 5,644,765 A | 7/1997 | Shimura et al. |
|---|---|---|
| 7,702,681 B2 | 4/2010 | Brewer et al. |
| 2003/0231806 A1* | 12/2003 | Troyanker ..................... 382/305 |
| 2006/0143176 A1* | 6/2006 | Mojsilovic et al. ............... 707/6 |
| 2008/0089591 A1 | 4/2008 | Zhou et al. |
| 2009/0190797 A1 | 7/2009 | McIntyre et al. |
| 2010/0195914 A1* | 8/2010 | Isard et al. .................... 382/201 |
| 2010/0310174 A1 | 12/2010 | Reznik |
| 2011/0150324 A1* | 6/2011 | Ngan et al. .................... 382/159 |
| 2012/0224773 A1* | 9/2012 | Sweet et al. ................... 382/195 |
| 2012/0301014 A1* | 11/2012 | Xiao et al. .................... 382/159 |

OTHER PUBLICATIONS

Cheng et al., A Deformable Local Image Descriptor, IEEE in 2008, Retrieved on Mar. 22, 2013, http://nguyendangbinh.org/Proceedings/CVPR/2008/data/papers/038.pdf, 8 pgs.
Zhang et al., Local Features and Kernels for Classification of Texture and Object Categories:A Comprehensive Study, International Journal of Computer Vision, 2006, Retrieved on Mar. 22, 2013, http://research.microsoft.com/en-us/um/people/manik/projects/trade-off/papers/ZhangIJCV06.pdf, 26 pgs.

(Continued)

*Primary Examiner* — Mike Rahmjoo
(74) *Attorney, Agent, or Firm* — Gregory J. Koerner; Redwood Patent Law

(57) ABSTRACT

A system for performing an image categorization procedure includes an image manager with a keypoint generator, a support region filter, an orientation filter, and a matching module. The keypoint generator computes initial descriptors for keypoints in a test image. The support region filter and the orientation filter perform respective filtering procedures upon the initial descriptors to produce filtered descriptors. The matching module compares the filtered descriptors to one or more database image sets for categorizing said test image. A processor of an electronic device typically controls the image manager to effectively perform the image categorization procedure.

11 Claims, 9 Drawing Sheets

(56) References Cited

OTHER PUBLICATIONS

Ilinen, et al., Image Feature Localization by Multiple Hypotheses Testing of Gabor Features, vol.17, No. 3, Mar. 2008, pp. 311-325, http://personal.lut.fi/users/joni.kamarainen/downloads/publications/IEEETIP2008.pdf.

Lo et al., SIFT Keypoint Descriptors for Range Image Analysis, Annals of the BMVA, vol. 2008, No. 3, 2008, pp. 1-18, Retrieved on Mar. 22, 2013, http://www.bmva.org/annals/2008/2008-0003.pdf.

Nakodari, Upload a Image to TinEye and Find Similar Matching Images Instantly, http://www.addictivetips.com/internet-tips/upload-an-image-to-tineye-and find-similar-matching-images-instatnly/, Apr. 21, 2009, pp. 1.

* cited by examiner

514   FIG. 5

SYSTEM AND METHOD FOR EFFECTIVELY PERFORMING AN IMAGE CATEGORIZATION PROCEDURE

BACKGROUND SECTION

1. Field of the Invention

This invention relates generally to techniques for managing image information, and relates more particularly to a system and method for effectively performing an image categorization procedure.

2. Description of the Background Art

Implementing effective methods for managing image information is a significant consideration for designers and manufacturers of electronic systems. However, effectively implementing these electronic systems may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced operations may provide additional benefits to a system user, but may also place increased demands on the control and management of various system components. For example, an enhanced electronic system that effectively supports image categorization procedures may benefit from an efficient implementation because of the large amount and complexity of the digital data involved.

Due to growing demands on system resources and substantially increasing data magnitudes, it is apparent that developing new techniques for managing image information is a matter of concern for related electronic technologies. Therefore, for all the foregoing reasons, developing effective systems for managing image information remains a significant consideration for designers, manufacturers, and users of contemporary electronic systems.

SUMMARY

In accordance with the present invention, a system and method are disclosed for effectively performing an image categorization procedure. In accordance with one embodiment of the present invention, an image manager or other appropriate entity initially selects at least one test image for performing the image categorization procedure. The image manager then performs a down-sampling process upon the test image to produce a down-sampled image that typically has a lower resolution and fewer pixels than the original test image. In certain embodiments, the image manager may also perform a spectral filtering process upon the down-sampled image to produce a filtered image with a predetermined amount of the lower frequencies removed.

The image manager utilizes a keypoint generator to compute keypoint locations, support regions, and local orientations that are utilized to define initial descriptors for the keypoints in the particular test image. In certain embodiments, a keypoint descriptor may be implemented as a multi-dimensional descriptor (e.g., 128 dimensions) for a specified radius (support region) around a given keypoint. The image manager then utilizes a support region filter to perform a support region filtering procedure. For example, in certain embodiments, the support region filter may accept only support regions that are larger than a predefined support-region size threshold. In addition, the support region filter may reject any highly-overlapped support regions during the support region filtering procedure.

The image manager also may utilize an orientation filter to perform an orientation filtering procedure by utilizing any effective techniques. In certain embodiments, the orientation filter identifies any outlier keypoint pairs with orientations that differ significantly from the other keypoint pairs. These outliers may then be removed from further consideration during the orientation filtering procedure.

Following the foregoing support region filtering procedure and orientation filtering procedure, the image manager provides the resultant filtered descriptors to a matching module which performs a descriptor matching procedure to compare the filtered descriptors for a given test image with images from various previously-categorized image sets stored in an image database.

The matching module may utilize any effective and robust matching techniques for performing the descriptor matching procedure. For example, in certain embodiments, matching module may compare the filtered descriptors from the test image with corresponding descriptors from various image sets in the categorized image database. The matching module may identify an image matching result between the test image and the database image if the number of matching descriptors is greater than a predefined match threshold.

The matching module may also perform a match filtering procedure to reject, false positive matches by requiring a low matching distance that is less than a predefined distance threshold. After the match filtering procedure is completed, then the resultant categorized image may be added to the appropriate image set in the database to complete the image categorization procedure. For all the foregoing reasons, the present invention therefore provides an improved a system and method for effectively performing an image categorization procedure

DETAILED DESCRIPTION

The present invention relates to an improvement in image categorization systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively performing an image categorization procedure, and may include an image manager with a keypoint generator, a support region filter, an orientation filter, and a matching module. The keypoint generator computes initial descriptors for keypoints in a test image. The support region filter and the orientation filter perform respective filtering procedures upon the initial descriptors to produce filtered descriptors. The matching module compares the filtered descriptors to one or more database image sets for categorizing the test image. A processor of an electronic device typically controls the image manager to effectively perform the image categorization procedure.

Figure 1:
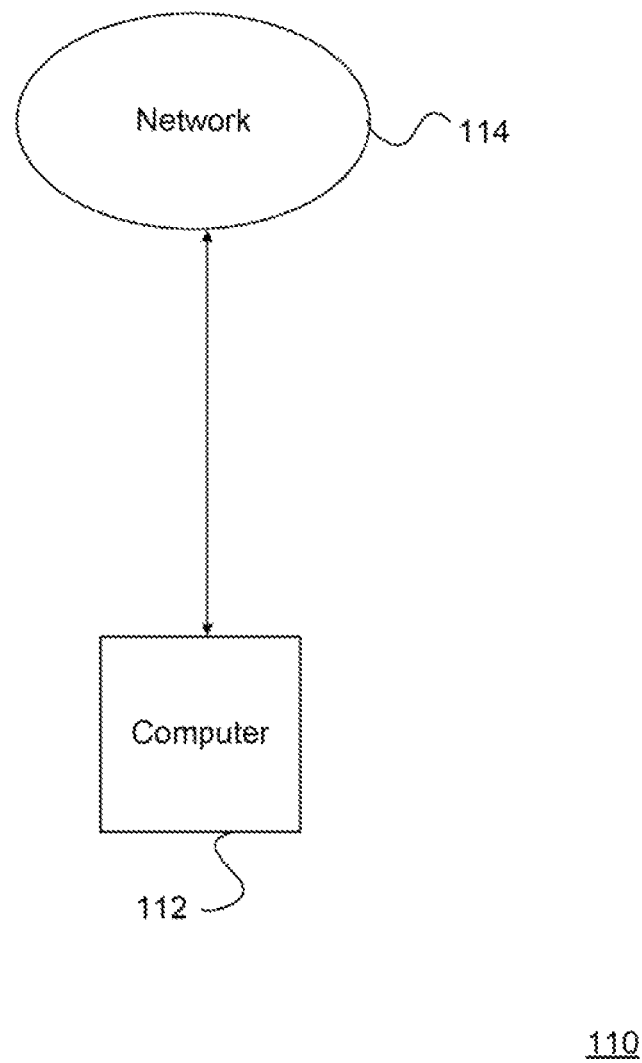
FIG. 1 is a block diagram of an electronic system, in accordance with one embodiment of the present invention.

Referring now to FIG. 1, a block diagram of an electronic system 110 is shown, in accordance with one embodiment of the present invention. In the FIG. 1 embodiment, electronic system 110 may include, but is not limited to, a computer 112 and a network 114. In alternate embodiments, electronic system 110 may be implemented using various components and configurations in addition to, or instead of those discussed in conjunction with the FIG. 1 embodiment. For example, system 110 may readily include any number of other electronic devices in addition to computer 112.

In the FIG. 1 embodiment, computer 112 may be implemented as any electronic device that is configured to support and manage various functionalities in electronic system 110. In the FIG. 1 embodiment, network 114 may include any appropriate entities or devices that communicate with computer 112 via wireless or wired communication techniques. In the FIG. 1 embodiment, computer 112 may perform an image categorization procedure.

In accordance with the present invention, computer 112 is designed to identify images that are captured at the same location in a short period of time so that the contents are highly correlated. The images are very similar with a high proportion of content overlapping and limited changes in characteristics such as composition, content, exposure, and camera settings like zoom, shift, and rotation. The general method for this invention is to use content-based image retrieval in which a set of similarity measures or descriptors are generated to measure how images are correlated. This may result in false matches that include images that are similar according to the designed similarity measures, but are quite different to human perception. A second stage of the invention may therefore advantageously filter the descriptors to remove the unwanted false matches.

In certain embodiments, a keypoint generator identifies potential point-to-point correspondences (keypoints) between images. This basic input is further processed in a set of novel filtering procedures to recognize highly reliable correspondences. With the help of these filters, larger corresponding regions are identified that are reliable across various changing conditions. New matching criteria are also designed so that these reliable correspondences translate to a categorization algorithm for the whole image. A database for existing matched images is also implemented so that each new test image may be quickly matched against previously categorized images. The implementation and utilization of the FIG. 1 computer 112 is further discussed below in conjunction with FIGS. 2-9B.

Figure 2:
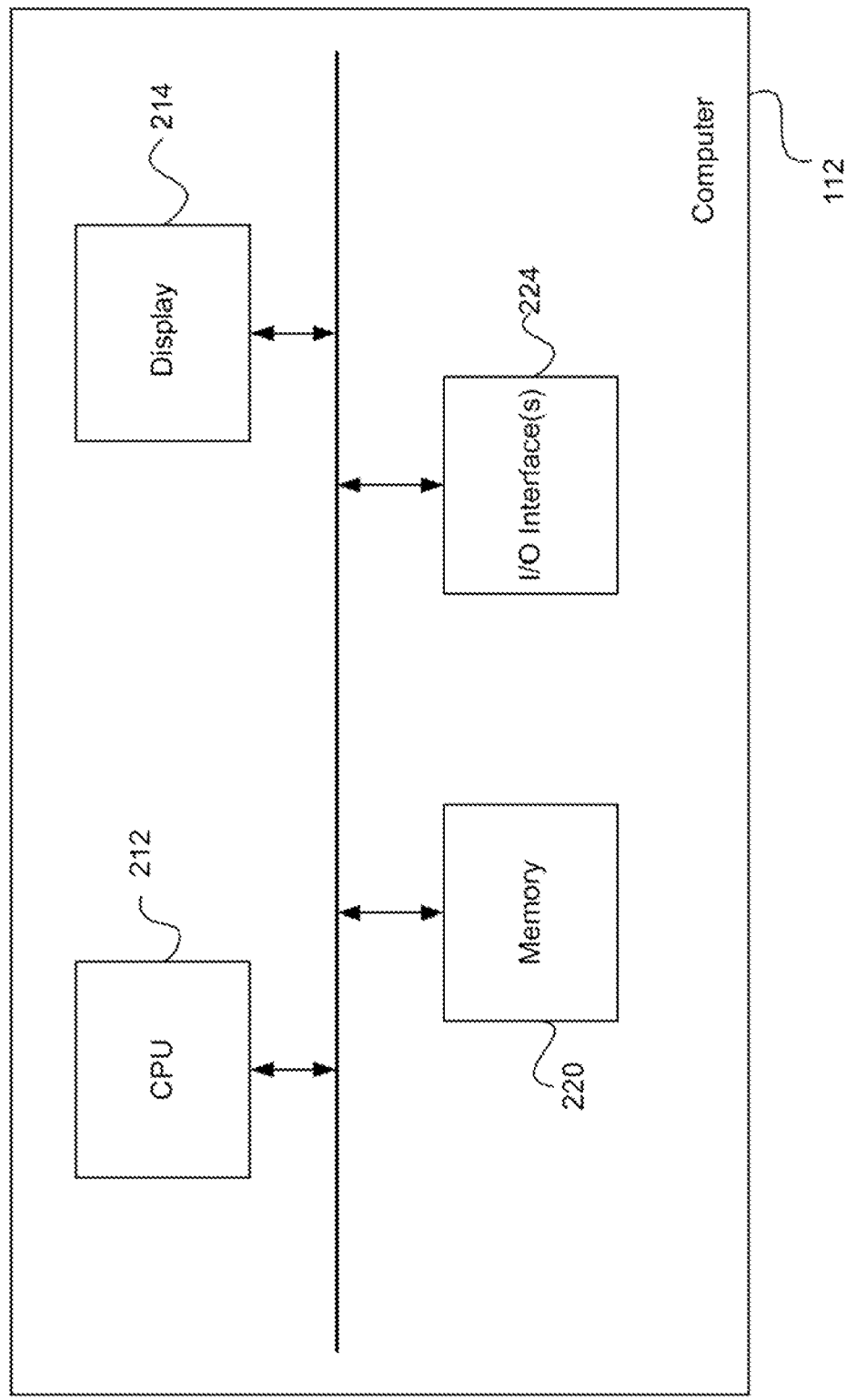
FIG. 2 is a block diagram for one embodiment of the computer of FIG. 1, in accordance with the present invention.

Referring now to FIG. 2, a block diagram for one embodiment of the FIG. 1 computer 112 is shown, in accordance with the present invention. In the FIG. 2 embodiment, computer 112 may include, but is not limited to, a central processing unit (CPU) 212, a display 214, a memory 220, and one or more input/output interfaces (I/O interfaces) 224. In alternate embodiments, computer 112 may be implemented using various components and configurations in addition to, or instead of, those certain of those components and configurations discussed in conjunction with the FIG. 2 embodiment. In addition, computer 112 may alternately be implemented as any other desired type of electronic device or entity.

In the FIG. 2 embodiment, CPU 212 may be implemented to include any appropriate and compatible microprocessor device that preferably executes software instructions to thereby control and manage the operation of computer 112. The FIG. 2 display 214 may include any effective type of display technology including a cathode-ray-tube monitor or a liquid-crystal display device with an appropriate screen for displaying various information to a device user.

In the FIG. 2 embodiment, memory 220 may be implemented to include any combination of desired storage devices, including, but not limited to, read-only memory (ROM), random-access memory (RAM), and various types of non-volatile memory, such as floppy disks or hard disks. The contents and functionality of memory 220 are further discussed below in conjunction with FIG. 3.

In the FIG. 2 embodiment, I/O interfaces 224 may preferably include one or more input and/or output interfaces to receive and/or transmit any required types of information for computer 112. For example, in the FIG. 2 embodiment, computer 112 may utilize I/O interfaces 224 to communicate with network 114 (see FIG. 1). In addition, a system user may utilize I/O interfaces 224 to communicate with computer 112 by utilizing any appropriate and effective techniques. The implementation and utilization of the FIG. 2 computer 112 is further discussed below in conjunction with FIGS. 3-9B.

Figure 3:
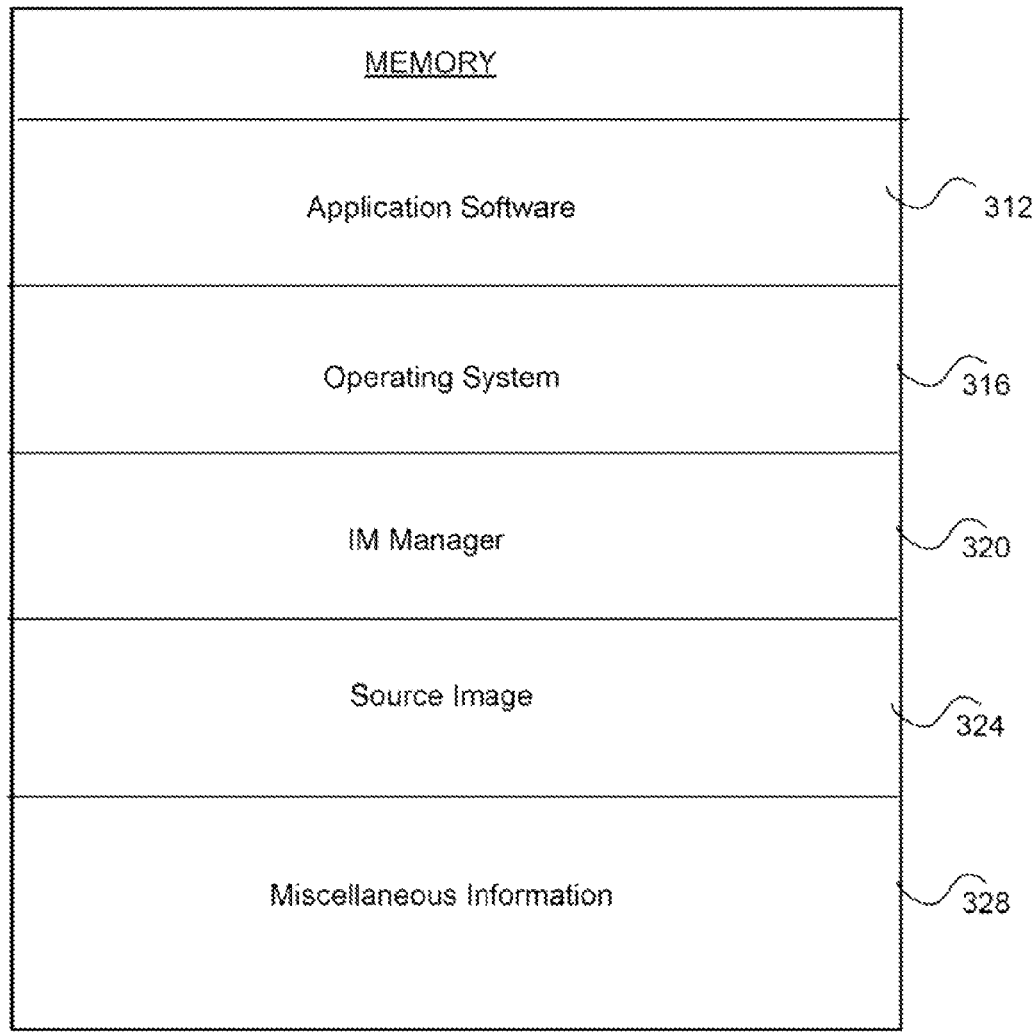
FIG. 3 is a block diagram for one embodiment of the memory of FIG. 2, in accordance with the present invention.

Referring now to FIG. 3, a block diagram for one embodiment of the FIG. 2 memory 220 is shown, in accordance with the present invention. In the FIG. 3 embodiment, memory 220 includes, but is not limited to, application software 312, an operating system 316, an image manager 320, image data 324, miscellaneous information 328, and processing data 332. In alternate embodiments, memory 220 may include various other components and functionalities in addition to, or instead of, certain those components and functionalities discussed in conjunction with the FIG. 3 embodiment.

In the FIG. 3 embodiment, application software 312 may include program instructions that are preferably executed by CPU 212 (FIG. 2) to perform various functions and operations for computer 112. The particular nature and functionality of application software 312 preferably varies depending upon factors such as the specific type and particular functionality of the corresponding computer 112.

In the FIG. 3 embodiment, operating system 316 preferably controls and coordinates low-level functionality of computer 112. In the FIG. 3 embodiment, image manager 320 may utilize image data 324 to effectively perform various image categorization procedures that accurately characterize and categorize a test image with respect one or more other images, in accordance with the present invention. In the FIG. 3 embodiment, miscellaneous information 328 may include any additional information or data required by computer 112 or image manager 320. In the FIG. 3 embodiment, processing data 332 may include any temporary or permanent information or data required by computer 112 or image manager 320 for performing image categorization procedures.

In the FIG. 3 embodiment, the present invention is disclosed and discussed as being implemented primarily as software. However, in alternate embodiments, some or all of the functions of the present invention may be performed by appropriate electronic hardware circuits that are configured for performing various functions that are equivalent to those functions of the software modules discussed herein. The implementation and utilization of image manager 320 are further discussed below in conjunction with FIGS. 4 through 9B.

Figure 4:
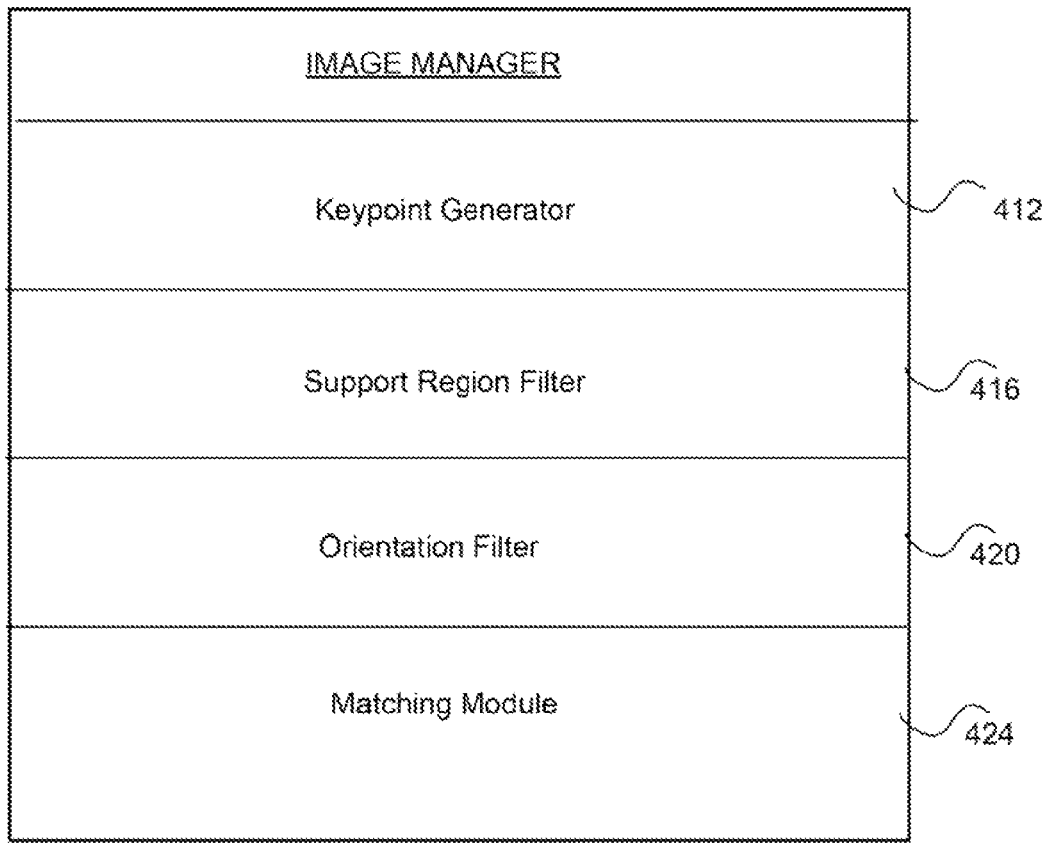
FIG. 4 is a block diagram of the image manager of FIG. 3, in accordance with one embodiment of the present invention.

Referring now to FIG. 4, a block diagram of an image manager 414 is shown, in accordance with one embodiment of the present invention. In the FIG. 4 embodiment, image manager 320 includes, but is not limited to, a keypoint generator 412, a support region filter 416, an orientation filter 420, and a matching module 424. In alternate embodiments, image manager 414 may be implemented using various components and configurations in addition to, or instead of, certain of those components and configurations discussed in conjunction with the FIG. 4 embodiment.

In the FIG. 4 embodiment, image manager 320 may utilize keypoint generator 412 to generate appropriate keypoints for creating corresponding descriptors to characterize images. In the present invention, keypoint generator 412 may define keypoints in an image according to any appropriate criteria or techniques. In one embodiment, keypoint generator 412 may be implemented to include a conventional or enhanced version of a known Scalar Invariant Feature Transform (SIFT).

In certain embodiments, keypoint generator 412 performs a scale-space extrema detection procedure to derive a support region σ corresponding to a keypoint. The keypoint generator 412 also performs a keypoint localization procedure to thereby define specific horizontal and vertical coordinates (x, y, σ) for the keypoint with respect to the support region. The keypoint generator 412 further performs an orientation assignment procedure to define a specific orientation θ for the keypoint. Finally, the keypoint generator 412 utilizes the foregoing information to create a keypoint descriptor $S(x, y, \sigma, \theta)$ to represent the keypoint with respect to location, support region, and orientation within a given image. Additional details with respect to keypoint generator 412 are provided below in conjunction with FIGS. 6-9B.

In the FIG. 4 embodiment, image manager 320 may utilize support region filter 416 to perform a support region filtering procedure that is further discussed below in conjunction with FIGS. 6-9B. In the FIG. 4 embodiment, image manager 320 may utilize orientation filter 420 to perform an orientation filtering procedure that is further discussed below in conjunction with FIGS. 6-9B. In the FIG. 4 embodiment, image manager 320 may utilize matching module 424 to perform a matching procedure that is further discussed below in conjunction with FIGS. 6-9B.

Figure 5:
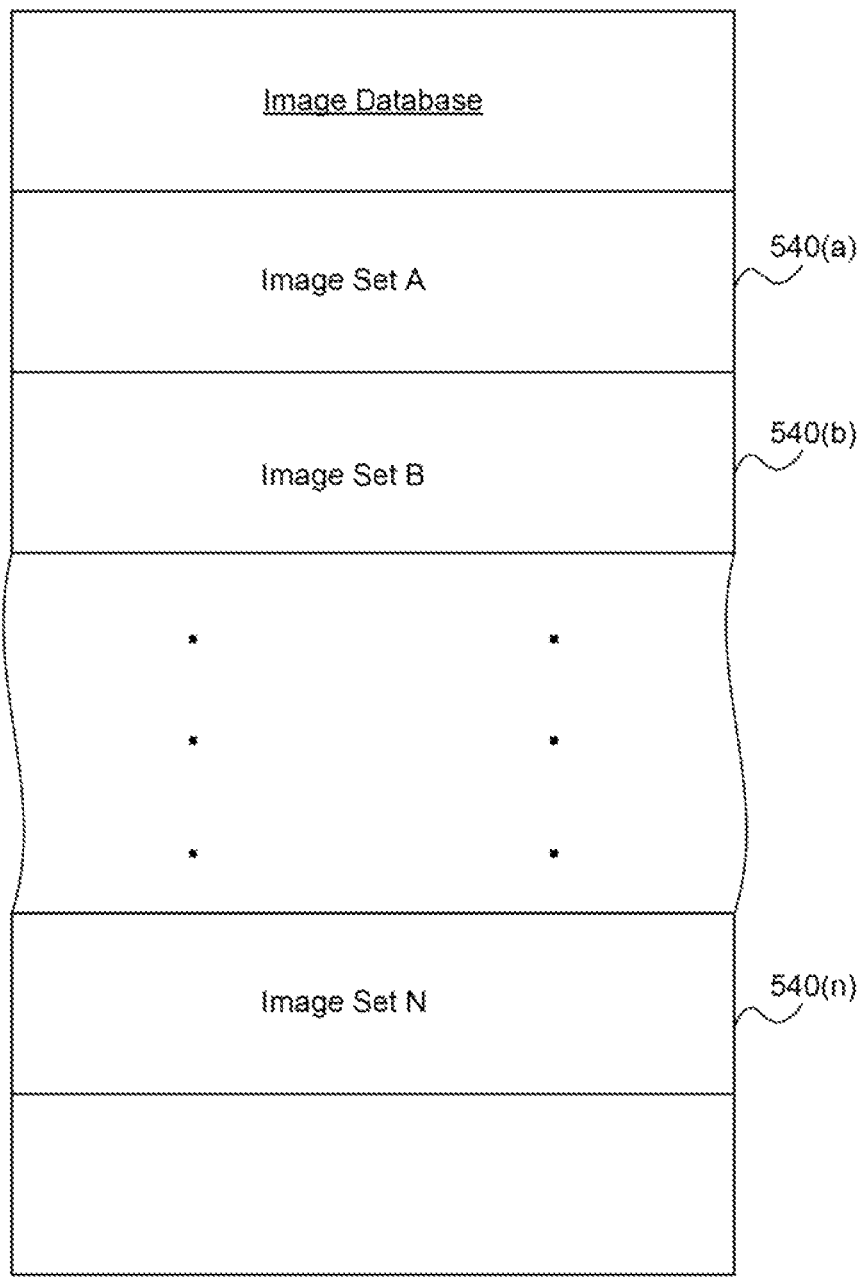
FIG. 5 is a block diagram of an image database, in accordance with one embodiment of the present invention.

Referring now to FIG. 5, a block diagram of an image database 514 is shown, in accordance with one embodiment of the present invention. In alternate embodiments, image database 514 may be implemented using various components and configurations in addition to, or instead of, certain of those components and configurations discussed in conjunction with the FIG. 5 embodiment.

In the FIG. 5 embodiment, image database 514 includes a series of individual image sets 540(a) through 540(n). In accordance with certain embodiments of the present invention, each image set 540 represents a distinct category of images that has previously been identified by image manager 320 (FIG. 4) as being captured at the same approximate location. In the FIG. 5 embodiment, appropriate keypoints and descriptors are preferably stored along with the categorized image to facilitate future categorization procedures with respect to new test images.

In accordance with various embodiments of the present invention, image database 514 may be implemented and stored in any appropriate location(s). For example, image database 514 may reside on computer 112, or alternately, may reside on one or more computers, databases, or other locations in network 114 (FIG. 1). Additional details for effectively performing an image categorization procedure are further discussed below in conjunction with FIGS. 6-9B.

Figure 6:
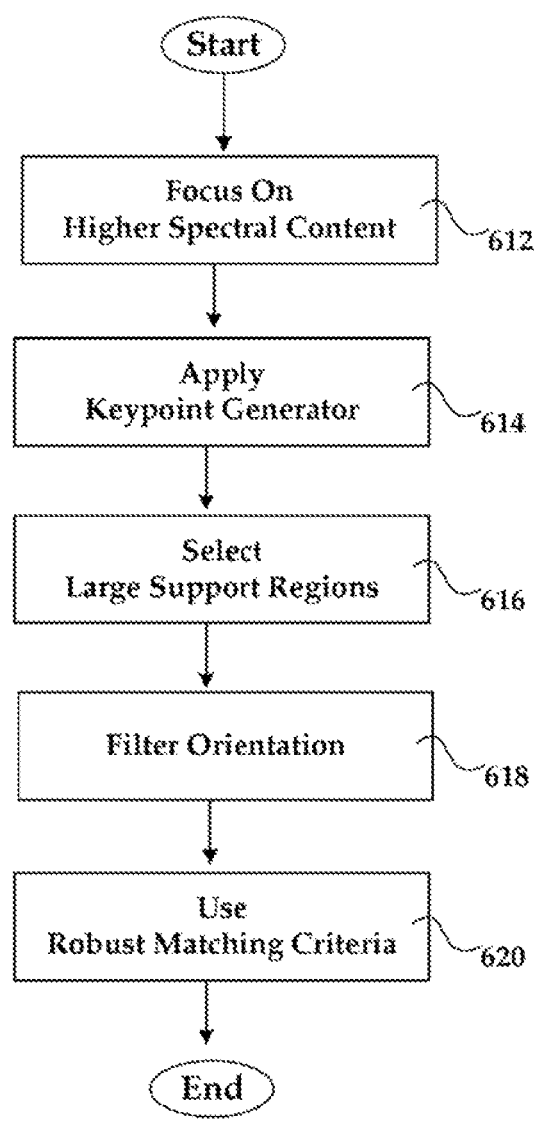
FIG. 6 is a flowchart illustrating a general approach for performing an image categorization procedure, in accordance with one embodiment of the present invention.

Referring now to FIG. 6, a flowchart illustrating a general approach for performing an image categorization procedure is shown, in accordance with one embodiment of the present invention. The FIG. 6 embodiment is presented for purposes of illustration, and in alternate embodiments, image categorization procedures may be performed using various steps and functionalities in addition to, or instead of, certain of those steps and functionalities discussed in conjunction with the FIG. 6 embodiment.

In step 612 of the FIG. 6 embodiment, the present invention focuses on higher spectral content in a given test image to eliminate variations in exposure and lighting during the image categorization procedure. In step 614, a keypoint generator 412 (FIG. 4) is applied to the test image to achieve scale and orientation invariance, and to acquire information regarding keypoints in the image. In particular, high-dimensional descriptors may be created that include location information, support regions, and principle orientations for the respective keypoints.

In step 616, the present invention selects large support regions to provide an improved characterization of local regions. In step 618, the present invention filters the orientation characteristics to eliminate outliers (false matches) between pairs of keypoints. Finally, in step 620, the present invention utilizes robust matching criteria to match and verify the filtered descriptors of pairs of keypoints. Additional details and techniques for performing the foregoing image categorization procedure are further discussed below in conjunction with FIGS. 7-9B.

Figure 7:
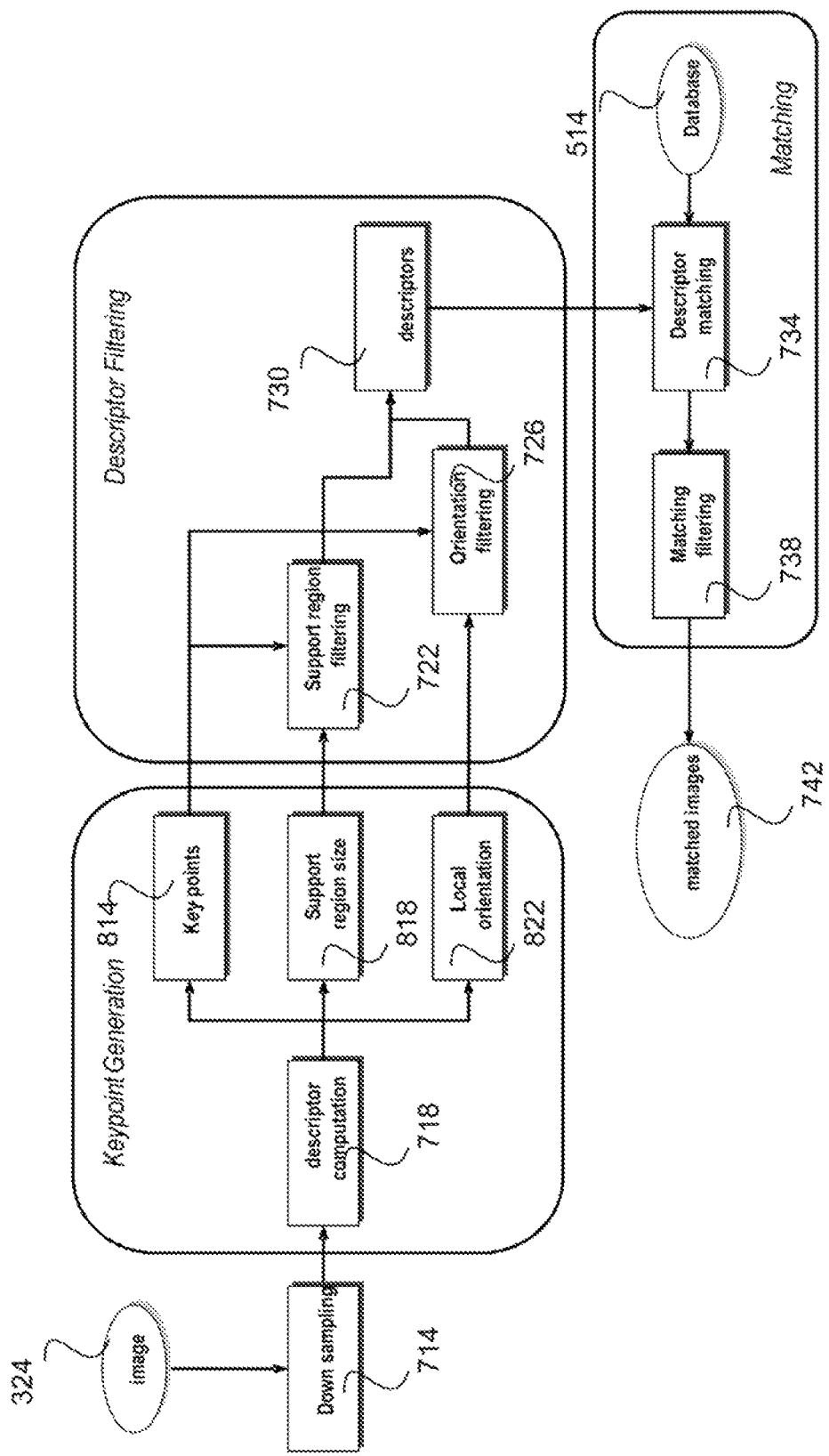
FIG. 7 is a diagram illustrating an image categorization procedure, in accordance with one embodiment of the present invention.

Referring now to FIG. 7, a diagram illustrating an image categorization procedure is shown, in accordance with one embodiment of the present invention. The FIG. 7 embodiment is presented for purposes of illustration, and in alternate embodiments, image categorization procedures may be performed using various steps and functionalities in addition to, or instead of, certain of those steps and functionalities discussed in conjunction with the FIG. 7 embodiment.

In the FIG. 7 embodiment, an image manager 320 or other appropriate entity initially selects at least one test image 324 for performing the image categorization procedure. In step 714, the image manager 320 then performs a down sampling process upon the test image 324 to produce a down-sampled image that typically has a lower resolution and fewer pixels than the original test image 324. In certain embodiments, the image manager 320 may also perform a spectral filtering process upon the down-sampled image to produce a filtered image with a predetermined amount of the lower frequencies removed.

In step 718, the image manager 320 utilizes a keypoint generator 412 (FIG. 4) to compute keypoint locations 814, support regions 818, and local orientations 822 that are utilized to define initial descriptors for the keypoints in the particular test image, as discussed above in conjunction with FIG. 4. In certain embodiments, a keypoint descriptor may be implemented as a multi-dimensional descriptor (e.g., 128 dimensions) for a specified radius (support region) around a given keypoint. In step 722, image manager 320 utilizes a support region filter 416 (FIG. 4) to perform a support region filtering procedure, as discussed further below in conjunction with FIG. 8. In step 726, image manager 320 utilizes, an orientation filter 420 (FIG. 4) to perform an orientation filtering procedure, as discussed further below in conjunction with FIGS. 9A-9B.

Following the foregoing support region filtering procedure and orientation filtering procedure, the image manager 320 provides the resultant filtered descriptors 730 to a matching module 424 (FIG. 4) that performs a descriptor matching procedure 734 to compare the filtered descriptors 730 for a given test image 324 with images from various previously-categorized image sets 540 from an image database 514 (see FIG. 5).

Matching module 424 may utilize any effective and robust matching techniques for performing the descriptor matching procedure. For example, in certain embodiments, matching module 424 may compare the filtered descriptors 730 for the keypoints from the test image with corresponding keypoint descriptors from various image sets in database 514. In the FIG. 7 embodiment, matching module 424 may calculate a Euclidean metric to define a matching distance $d(D_i, D_i')$ between corresponding pairs of keypoints from the test image 324 and a database image 540 by comparing each of the corresponding 128-D descriptors $D_i$ from the test image 324 and a database image 540.

The matching module 424 may then identify a matching result between the test image 324 and the database image 540 if the number of matching descriptors is greater than a pre-defined match threshold. In the FIG. 7 embodiment, the pre-defined match threshold may be set at five matching descriptor pairs. In step 738, matching module 424 may also perform a match filtering procedure to reject false positive matches by requiring a low matching distance $d(D_i, D_i')$ that is less than a predefined distance threshold. In the FIG. 7 embodiment, the predefined distance threshold may be equal to 120,000. After the match filtering procedure is completed, then the resultant matched image 742 may be added to the appropriate image set 540 in database 514 to complete the image categorization procedure. Additional details and techniques for performing the foregoing support region filtering and orientation filtering are further discussed below in conjunction with FIGS. 8-9B.

Figure 8:
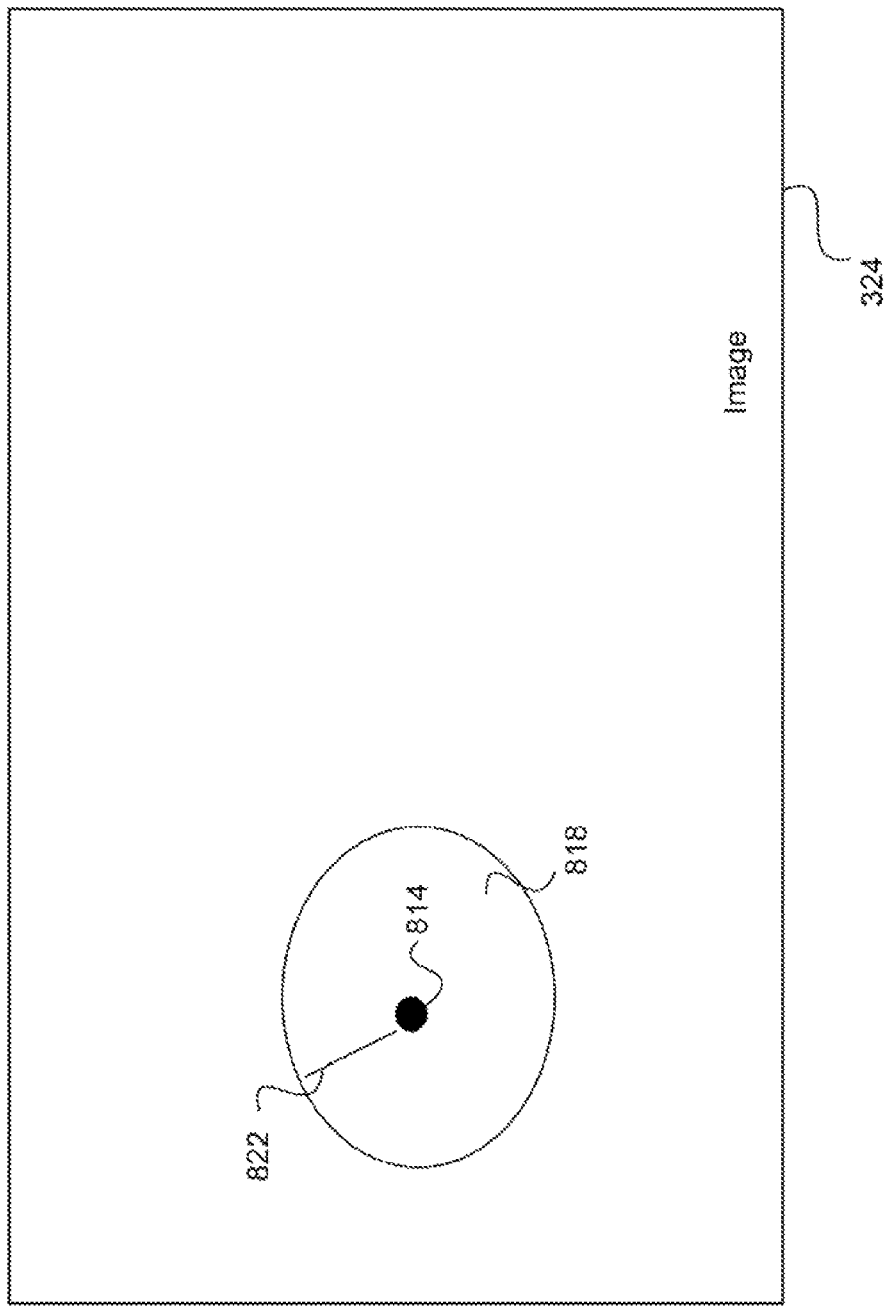
FIG. 8 is a diagram illustrating an exemplary keypoint and support region, in accordance with one embodiment of the present invention.

Referring now to FIG. 8, a diagram illustrating an exemplary keypoint 814 and corresponding support region 818 is shown, in accordance with one embodiment of the present invention. The FIG. 8 diagram is presented for purposes of illustration, and in alternate embodiments, keypoints 814 and support regions 818 may be implemented using various elements and configurations in addition to, or instead of, certain of those elements and configurations discussed in conjunction with the FIG. 8 embodiment.

In the FIG. 8 embodiment, a test image 324 is shown with an exemplary keypoint 814 surrounded by a support region 818 with a given local orientation 822 that is represented by a short line. For purposes of clarity, test image 324 is shown with only a single keypoint 814. However, in practice, test image 424 typically would have many keypoints 814 at locations determined by keypoint generator 412 (FIG. 4).

As discussed above in conjunction with FIG. 7, a support region filter 416 (FIG. 4) may perform a support region filtering procedure by utilizing any effective techniques. For example, in certain embodiments, support region filter 416 may accept only support regions 818 that are larger than a predefined support-region size threshold. In the FIG. 8 embodiment, the support-region size threshold may be set at nine pixels. In addition, support region filter 416 may reject any highly-overlapped support regions during the support region filtering procedure.

Figure 9B:
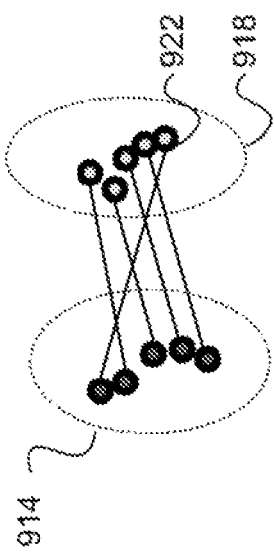
FIGS. 9A and 9B are diagrams illustrating an orientation filtering procedure, in accordance with one embodiment of the present invention.
Figure 9A:
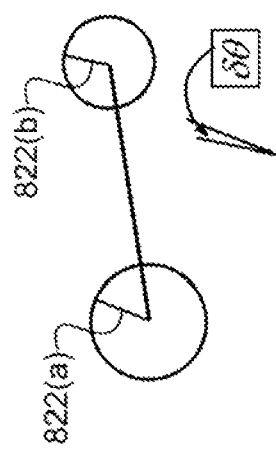

Referring now to FIGS. 9A and 9B, diagrams illustrating an orientation filtering procedure are shown, in accordance with one embodiment of the present invention. The FIG. 9 diagrams are presented for purposes of illustration, and in alternate embodiments, orientation filtering procedures may be implemented using elements and techniques in addition to, or instead of, certain of those elements and techniques discussed in conjunction with the FIG. 89 embodiment.

In accordance with the present invention, true matching regions are many in number and coherent in principle orientation. During the orientation filtering procedures, orientation filter 420 evaluates the relative orientations of corresponding pairs of keypoints from a test image 324 (FIG. 7) and a database image 540 (FIG. 5). In the FIG. 9A embodiment, an orientation $822(a)$ of a keypoint/support region in a test image is shown. Similarly, FIG. 9A shows an orientation $822(b)$ of a keypoint/support region in a database image. In certain embodiments, orientation filter 420 may compare the orientations $822(a)$ and $822(b)$ to derive an orientation difference $\delta\theta$, as shown in FIG. 9A.

FIG. 9B shows a set of keypoints 914 from a test image connected by candidate lines to corresponding keypoints 918 from a database image. Orientation filter 420 may perform the orientation filtering procedure by utilizing any effective techniques. For example, in certain embodiments, orientation filter 420 may require the number of candidate lines between corresponding keypoints to be greater than a predetermined candidate threshold. In certain embodiments, the candidate threshold may be set at ten candidate lines.

In certain embodiments, orientation filter 420 may require that the standard deviation $\sigma(\delta\theta)$ of the orientation difference $\delta\theta$ for matched candidate lines satisfy the following equation: $\sigma(\delta\theta)<\pi/3$. During the orientation filtering procedure, the orientation filter 420 may also require that the individual orientation difference is within $\sigma(\delta\theta)$ of the mean value of all the candidate lines. The FIG. 9B example shows five pairs of keypoints. Four of the pairs have relatively similar orientations, and therefore they would be accepted. However, one outlier 922 is shown with a significantly different orientation. Accordingly, orientation filter 420 would remove, keypoints of the outlier 922 from further consideration during the orientation filtering procedure.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing an image categorization procedure, comprising:

an image manager that computes descriptors for keypoints in a test image, said image manager utilizing a support region filter for filtering said descriptors to produce filtered descriptors, said image manager comparing said filtered descriptors to one or more image sets for categorizing said test image, said image manager utilizing a keypoint generator to identify keypoints in said test image according to predefined keypoint criteria, said keypoint generator identifying specific horizontal and vertical coordinates (x, y) for each of said keypoints, said keypoint generator deriving support regions σ corresponding to each of said keypoints, said keypoint generator defining specific orientations θ for each of said keypoints, said keypoint generator utilizing said horizontal and vertical coordinates, said support regions, and said orientations to create initial descriptors S (x, y, σ, θ) for each of said keypoints; and a processor of an electronic device that controls said image manager to perform said image categorization procedure.

2. A system for performing an image categorization procedure, comprising:

an image manager that computes descriptors for keypoints in a test image, said image manager filtering said descriptors to produce filtered descriptors, said image manager comparing said filtered descriptors to one or more image sets for categorizing said test image, said image manager utilizing a keypoint generator to identify keypoints in said test image according to predefined keypoint criteria, said keypoint generator identifying specific horizontal and vertical coordinates (x, y) for each of said keypoints, said keypoint generator deriving support regions σ corresponding to each of said keypoints, said keypoint generator defining specific orientations θ for each of said keypoints, said keypoint generator utilizing said horizontal and vertical coordinates, said support regions, and said orientations to create initial descriptors s (x, y, σ, θ) for each of said keypoints, said initial descriptors being implemented as multi-dimensional descriptors with 128 dimensions; and a processor of an electronic device that controls said image manager to perform said image categorization procedure.

3. A system for performing an image categorization procedure, comprising:

an image manager that computes descriptors for keypoints in a test image, said image manager filtering said descriptors to produce filtered descriptors, said image manager comparing said filtered descriptors to one or more image sets for categorizing said test image, said image manager utilizing a keypoint generator to identify keypoints in said test image according to predefined keypoint criteria, said keypoint generator identifying specific horizontal and vertical coordinates (x, y) for each of said keypoints, said keypoint generator deriving support regions σ corresponding to each of said keypoints, said keypoint generator defining specific orientations θ for each of said keypoints, said keypoint generator utilizing said horizontal and vertical coordinates, said support regions, and said orientations to create initial descriptors s (x, y, σ, θ) for each of said keypoints, said image manager utilizing a support region filter to perform a support region filtering procedure upon said initial descriptors to produce refined descriptors; and a processor of an electronic device that controls said image manager to perform said image categorization procedure.

4. The system of claim 3 wherein said support region filter accepts only support regions that are larger than a predefined support-region size threshold.

5. The system of claim 3 wherein said support region filter rejects any highly-overlapped ones of said support regions during said support region filtering procedure.

6. The system of claim 3 wherein said image manager utilizes an orientation filter to perform an orientation filtering procedure upon said refined descriptors to produce filtered descriptors.

7. The system of claim 6 wherein said orientation filter removes outliers that include pairs of said keypoints from said test image and said image set that fail to conform to predefined orientation limitations.

8. The system of claim 7 wherein said orientation filter requires that a standard deviation $\sigma(\delta\theta)$ of an orientation difference $\delta\theta$ satisfy an equation:

$$\sigma(\delta\theta) < \pi/3$$

9. The system of claim 7 wherein said orientation filter requires that an individual orientation difference be within said standard deviation $\sigma(\delta\theta)$ of a mean value of all orientation lines between said pairs of said keypoints.

10. The system of claim 6 wherein said image manager utilizes a matching module to perform a matching procedure by comparing said filtered descriptors to calculated descriptors of categorized images from said image sets that are stored in a database.

11. The system of claim 10 wherein said matching module calculates a Euclidean metric to define a matching distance $d(D_i, D_i')$ between each corresponding pair of said keypoints by comparing descriptors from said test image and said categorized images, said matching module identifying a matching result if a total number of matching descriptors is greater than a predefined match threshold, said matching module also perform a match filtering procedure to reject false positive matches by requiring a low matching distance $d(D_i, D_i')$ that is less than a predefined distance threshold.

* * * * *